Sept. 22, 1936.    HANS-GUNTER ENGEL ET AL    2,054,931
SCALE OR DIAL ARRANGEMENT FOR BROADCAST RECEIVERS OR THE LIKE
Filed Sept. 13, 1934
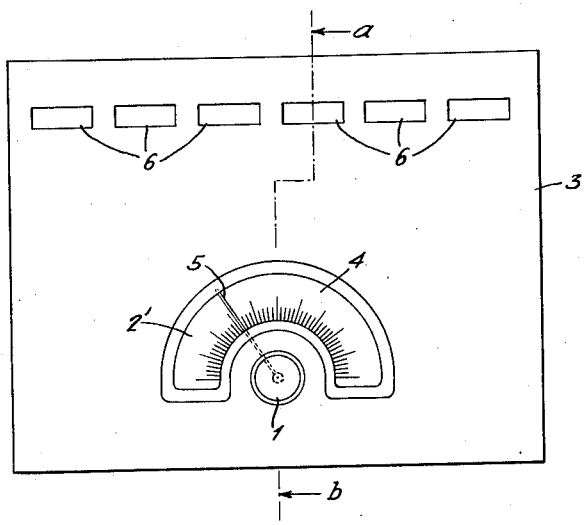
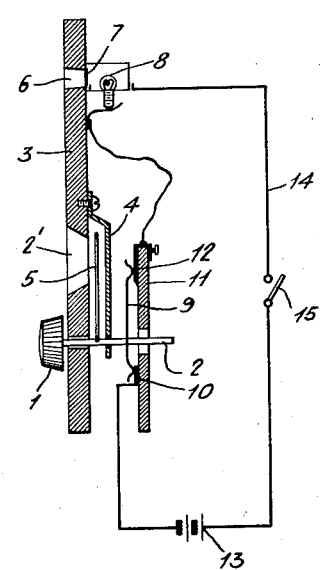
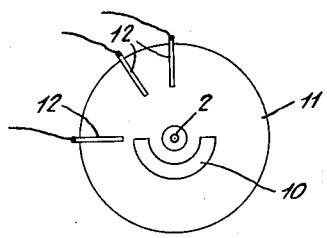
INVENTORS
HANS-GUNTER ENGEL
FRIEDRICH ULRICH
BY
ATTORNEY Patented Sept. 22, 1936

2,054,931

UNITED STATES PATENT OFFICE 2,054,931

SCALE OR DIAL ARRANGEMENT FOR BROADCAST RECEIVERS OR THE LIKE

Hans-Gunter Engel and Friedrich Ulrich, Berlin, Germany, assignors to Telefunken Gesellschaft für Drahtlose Telegraphie m. b. H., Berlin, Germany, a corporation of Germany Application September 13, 1934, Serial No. 743,799
In Germany September 25, 1933

4 Claims. (Cl. 116—124.4)

In most modern broadcast receiving sets is provided a calibrated or graduated scale or dial having station names printed thereon. Because of the sensitiveness readily attainable in modern apparatus, the number of stations that can be heard, and thus the number of names or identification marks to be placed upon the dial is very great. Of course, the quality of reception is not the same for all stations. Indeed, the reception of a good many transmitter stations is impaired so much by atmospherics and fading that the fan confines himself mostly to a limited number of high-quality stations after the first excitement over the great number of audible stations has subsided. When this stage has been reached the majority of station names indicated on the dial is superfluous; in fact, this merely tends to make the dial hard to follow up.

Hence, according to this invention it is suggested to so choose the scale or dial arrangement that a small dial is merely provided as a general survey scale, as it were, while for tuning in stations selected according to certain viewpoints or criteria, reading windows or peep holes coordinated respectively to each one of these stations are provided, the lettering of such preferential stations being emphasized or made conspicuous in some way as soon as the tuning to the respective station has been effected. The general survey scale serves merely for the purpose of determining the identity of certain stations that come in so that, because of its subordinate role it may be made of reduced size. The same may be provided with a graduation or be calibrated in terms of kc. or wave-lengths. Selection of the transmitter stations to be selected by means of the said windows may be made according to different rules, for example, the high power stations of a country may be selected thereby. By a slight change of the scale device being otherwise of standardized construction, one and the same apparatus may be used in different countries merely by changing the station names of the indicators. It is similarly easy to include in the list of domestic transmitter stations also a few foreign stations which come in under especially favorable conditions or whose programs are particularly attractive. The "emphasizing" of the various transmitters after tuning is effected most suitably by illuminating the reading window corresponding thereto. In coupling relation with the tuning device is a contact arrangement whereby the switching of the lamps mounted posteriorly of the various windows is insured. Care must be taken so that the transmitter stations coordinated to any window may be altered. By the use of lamps of different colors, for instance, the various wavelength ranges or bands may be identified.

To illustrate the practical application of the basic idea of this invention, a scale or dial arrangement is shown forming part of the front panel of a receiver as shown in Fig. 1.

Fig. 2 is a section taken on line a, b, and Fig. 3 a detail view of the contact disk 11.

Referring to the drawing, 1 is the tuning dial which drives a spindle 2 on which the tuning means are mounted. 2' is a cut-out in the front panel 3 of the receiver posteriorly of which is mounted the survey scale 4. In front of this scale is moved the hand 5 mounted upon the spindle 2. At suitable points in the front panel of the receiver set are disposed a number of windows or recesses 6, the drawing showing six thereof, in the rear of which are labels or signs 7 being made of translucent material and bearing the names of the stations. Posteriorly of the said labels or signs 7, separated from the adjacent windows by screens, are lamps 8. On the spindle 2, in the rear of the dial, is disposed a contact clip or blade 9 comprising arms of unequal length. The shorter arm is constantly in frictional or wiping engagement with a semi-circular contact piece 10 which is secured upon a circular insulation disk 11. The latter is fixedly connected with the chassis. On its outer circumference are disposed a number of metallic jockeys or contacts 12 the number thereof being the same as that of the windows, and each of the said jockeys is in conducting relationship with a corresponding lamp 8. The said jockeys are shiftable or adjustable about the periphery of disc 11; hence, conditions can be so made that each of the lamps 8 connected with a jockey can be made to flash in any desired position of the tuning means. In the circuit comprising battery 13, metallic segment 10, contact clip 9, jockey 12, lamp 8, and return lead 14, there is included a switch 15 by means of which a further selection from among the stations becoming visible in the rear of the windows is feasible. The said switch may be coupled, for instance, with the wave-change switch such that only part of the lamps will be caused to flash.

The arrangement hereinbefore described is to serve solely for the purpose of illustrating the basic idea of the invention; but the embodiment thereof is not confined to the construction here shown and described.

Having described our invention, what we claim is:

1. In an indicator for a tuning means, the combination of a front panel having an aperture therein, a tuning shaft passing through said panel, an indicator on said shaft movable behind said aperture, a graduated scale mounted behind said indicator, a plurality of station plates mounted on said panel each of said plates being marked with station letters, a lamp mounted behind each of said station plates, and a circuit arranged to energize said lamps selectively and including a switch blade mounted on said tuning shaft and a plurality of spaced apart contacts adapted to be engaged by said switch blade mounted behind and concealed by said graduated scale.

2. Means for visually indicating the position of a tuning means, comprising the combination of a shaft connected to the said tuning means, an insulation disc mounted adjacent said shaft, a plurality of translucent station plates, a lamp mounted adjacent each of said plates, a long stationary contact plate secured to said disc, a switch arm carried by said shaft and in constant engagement with said contact plate, a plurality of narrow contact plates arranged at spaced intervals on said disc and in the path of said switch arm, and a circuit connecting each of said narrow contact plates with a different one of said lamps.

3. The combination defined in the preceding claim in which said narrow contact plates are adjustably mounted on the periphery of said disc.

4. A device for visually indicating the position of a tuning means comprising the combination of a front panel, an insulation disc mounted parallel to said panel, a shaft connected to said tuning means and passing through said panel at right angles thereto, a semicircular metallic plate secured to said disc, a plurality of narrow contacts adjustably secured to the periphery of said disc, a switch member secured to said shaft and having a portion in constant engagement with said metallic plate and a second portion arranged to successively engage said narrow contacts, a plurality of station indicia mounted on said front panel, a lamp mounted adjacent each of said station indicia and electrical connections between each of said lamps and a different one of said narrow contacts.

HANS-GUNTER ENGEL.
FRIEDRICH ULRICH.